United States Patent [19]
Carlson

[11] 3,751,995
[45] Aug. 14, 1973

[54] SEQUENTIAL ROTARY AND LINEAR ACTUATING MECHANISM

[75] Inventor: John H. Carlson, Danvers, Mass.

[73] Assignee: USM Corporation, Flemington, N.J.

[22] Filed: June 2, 1972

[21] Appl. No.: 259,080

[52] U.S. Cl................................. 74/20, 49/255, 16/52, 292/57
[51] Int. Cl............................................. F16h 21/00
[58] Field of Search.................... 74/20, 21; 16/52; 49/255, 381, 384; 160/188; 292/57

[56] References Cited
UNITED STATES PATENTS

| | | | |
|---|---|---|---|
| 1,518,613 | 12/1924 | Teeter | 49/255 |
| 1,621,047 | 3/1927 | Young | 49/255 |
| 3,346,992 | 10/1967 | Lodge | 49/255 |
| 1,405,315 | 1/1922 | Moore | 160/188 |
| 1,479,709 | 1/1924 | Goldstein | 292/57 |

Primary Examiner—Charles J. Myhre
Assistant Examiner—Wesley S. Ratliff, Jr.
Attorney—Carl E. Johnson et al.

[57] ABSTRACT

A compact mechanism for controlling angular and lateral positioning of one member in relation to another. Actuation is effected by a single prime mover through gearing of a type to rotate one of the two members until a rotational stop position is reached whereupon reaction forces on a helical spline cause relative lateral displacement until a predetermined locking relation is attained. The relative movement may sequentially be reversed and unlocked to restore the initial hinged relation.

7 Claims, 6 Drawing Figures

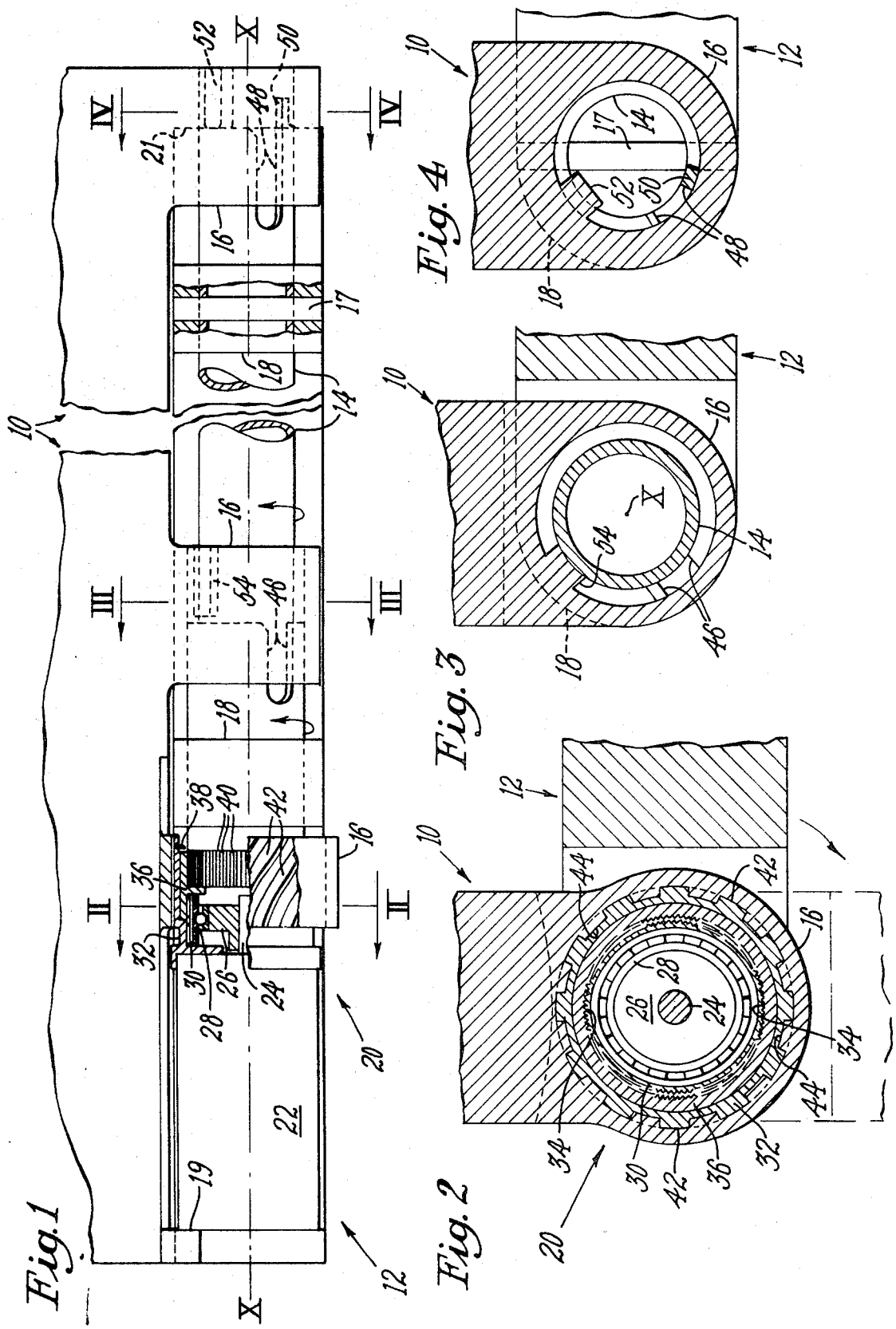

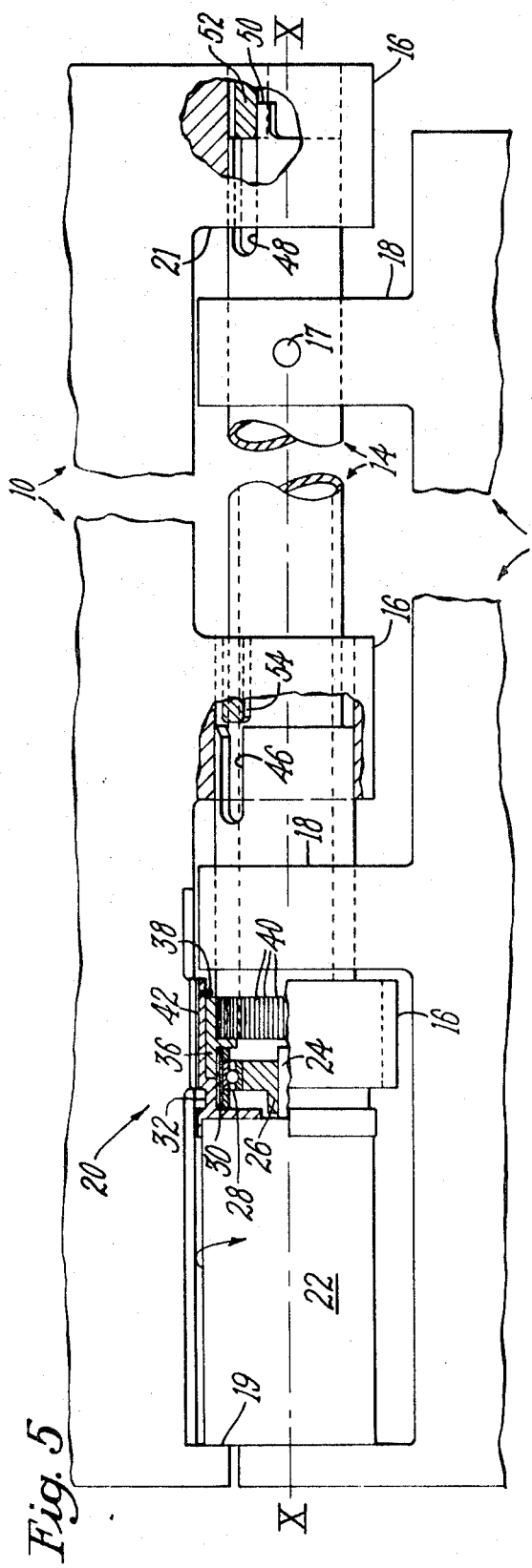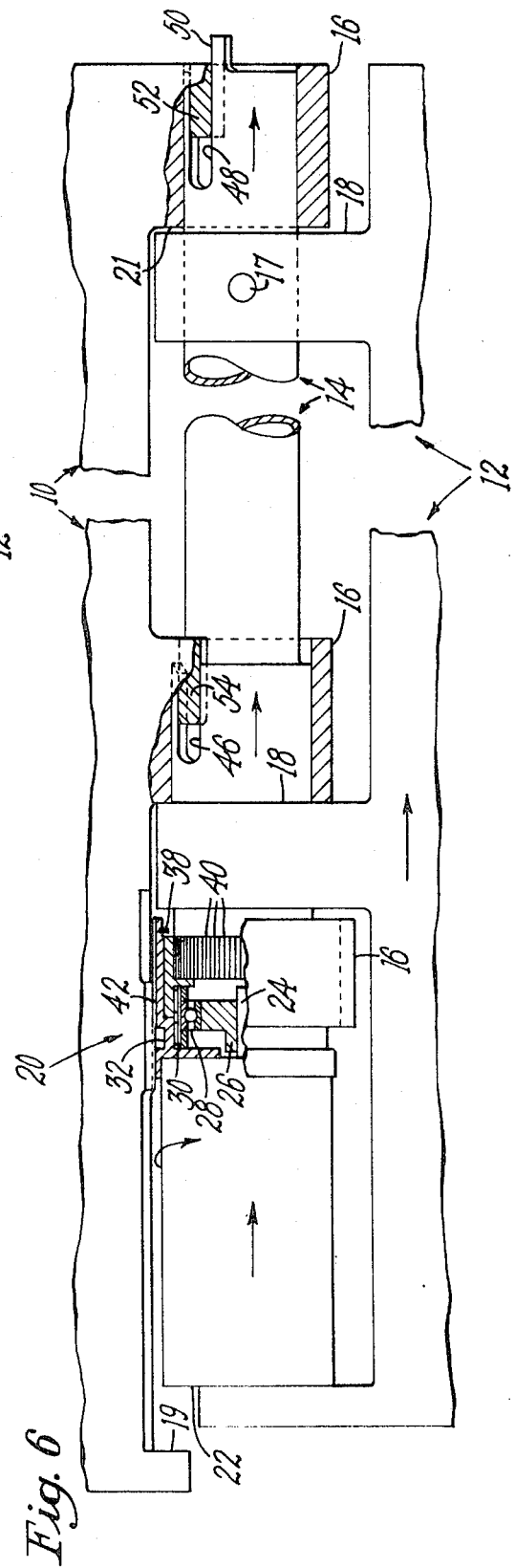

SEQUENTIAL ROTARY AND LINEAR ACTUATING MECHANISM

BACKGROUND OF THE INVENTION

This invention relates to actuating mechanism. More especially it pertains to such mechanism employing a laterally slidable spline, particularly a helical spline in combination with a slidable key for shifting and holding one member relative to another.

While the present invention is herein illustrated as preferably employing harmonic drive gearing, i.e., gearing wherein a circumferential wave of radial deflection is utilized, it will be understood that the invention is not necessarily thus limited. By way of background information, reference is made to "Dual Strain Wave Gearing" disclosed in U.S. Letters Pat. No. 2,943,513 issued July 5, 1960, in the name of C. W. Musser.

Many situations arise where it is desirable, especially by remote control, to be able to shift the relative positions of two members predeterminedly both angularly and laterally. In aircraft, space vehicles, and marine equipment, for instance, it is often required to deploy and lock an inaccessible appendage such as a control element or winglike structure relatively to a body. One can sometimes employ two prime movers, one for obtaining each of the rotary and linear movements; more often it is advantageous for reasons of weight, available space, and simplicity to derive the required positioning from a single motor. Advantageously, as herein shown, the single motor may be coaxial with the axis of rotation and translation, driving through reduction gearing first to rotate the hinged members to a desirable angular relation whereupon translatory movement effects their interlocking.

SUMMARY OF THE INVENTION

An object of this invention is to provide a compact actuating means whereby one of two pivotally related members is shiftable rotationally and laterally to a desired interlocking relation.

Another object of the invention is to provide in combination with a hinge pin interconnecting two members for relative movement about and along a common axis, an automatic mechanism for applying torque to the pin whereby a slot and keyway arrangement is effective to secure the members in predetermined position.

To these ends, and as herein shown, a feature of the invention resides in the provision, in combination with a first and second member and a rotatable and axially slidable shaft hingedly coupling the members, of a motor-reducer unit coaxial with the hinge pin, and including a helical spline, for translating the shaft along the hinge axis, and a slot and keyway one of which is on the shaft and the other of which is formed on one of the two members, the arrangement being such that in response to alignment of the slot and keyway, shaft rotation ceases and shaft translation thereupon commences, due to reaction of the helical spline with a like spline on one of the two members, to interlock the members by coupling the slot and keyway.

BRIEF DESCRIPTION OF THE DRAWINGS

The foregoing and other features of the invention will now be more particularly described in connection with an illustrative embodiment, and with reference to the accompanying drawings thereof, in which:

FIG. 1 is a view in side elevation, with a portion of reducer-gear transmission in axial section, of a sequential rotary and linear actuating mechanism controlling two hinged members;

FIG. 2 is a transverse section taken on the line II—II of FIG. 1;

FIG. 3 is a transverse section taken on the line III—III of FIG. 1;

FIG. 4 is a transverse section taken on the line IV—IV of FIG. 1;

FIG. 5 is a view similar to FIG. 1 but showing the parts at a later stage when the hinged members have been angularly shifted to an abutment position, and FIG. 6 is a view similar to FIG. 5 but showing the hinged members shifted to a locked condition.

DESCRIPTION OF PREFERRED EMBODIMENT

For convenience it will be assumed that a relatively stationary first member is a body generally designated 10, and a relatively pivotal second member is a winglike structure generally designated 12. It will be understood that the members 10,12 may have different shapes and functions, the terms "body" and "wing" being herein used in a comprehensive sense. A hinge pin in the form of a tubular shaft 14 is rotatably and axially slidable on an axis X—X (FIG. 1), the shaft extending through aligned bearing portions 16 of the body 10, and 18 of the wing 12. The wing is secured to the shaft 14 by suitable means such as a pin 17 (FIGS. 1, 4), and is engageable endwise with spaced thrust bearing surfaces 19,21 (FIGS. 1, 5, 6) of the body 10. When, in lieu of the pin 17, the shaft 14 is axially splined to the wing 12, only the shaft 14 need be shifted axially, and this alternative construction may be important in certain cases.

The wing 12 is herein assumed initially to extend substantially at right angles to the body 10 as shown in FIGS. 2–4 inclusive, and by actuator mechanism generally designated 20 (FIGS. 1 and 5) next to be described, the wing 12 is to be relatively angularly rotated (in this case about 90°) on the axis X—X (FIG. 5) and then translated into locked condition as shown in FIG. 6.

The degree of rotation and translation may be changed as required for particular applications of the invention.

Referring to FIGS. 1 and 2, a motor 22 having its drive shaft 24 coaxial with the tubular shaft 14, is coupled thereto by speed reduction gearing preferbly of harmonic drive type as will next be explained. A wave generator plug 26 of lobar shape (herein elliptoidal) driven by the shaft 24 transmits a circumferential wave of radial deflection through a wave generator bearing 28 to a flexpline 30 formed externally with two sets of axially spaced circumferential spline teeth. One of these sets of flexspine teeth cooperates with internal spline teeth circumferentially formed on a tubular circular spline 32 anchored on an end of the motor housing. The other set of external flexspline teeth meshes with internal spline teeth 34, at circumferentially spaced localities (180° apart in this case, as shown in FIG. 2), formed on a dual circular spline 36 coaxial with the shafts 14 and 24. The wing 12, by means of a retaining ring 38 (FIG. 1) seated therein maintains fixed axial relation between the circular spline 32, the flexpline 30 and the dual circular spline 36. The second internal set of spline teeth of the dual spline 36 meshes with spline teeth 40 circumferentially formed on an end portion of the shaft 14.

Externally formed on the circular spline 32 are helical spline teeth 42 (FIGS. 1 and 2) arranged to mesh with corresponding helical teeth 44 formed internally as one of the bearing portions 16 of the body 10. The helical teeth 42 preferably are largely axially coextensive with the dual circular spline 36.

It will be understood that, in accordance with the disclosure of the daul strain wave U.S. Pat. No. 2,943,513, output rotation of the motor shaft 24 transmits through the wave generator means 26,28 a circumferential wave of radial deflection to the flexspline 30. The circular spline 32 accordingly, at greatly reduced speed, due to the differential in the numbers of teeth in the sets of flexspline teeth and the fact that one set is anchored to the motor housing, rotates the dual circular spline 36 and hence the shaft 14 and the wing 12. A pair of aligned slots 46,48 axially extending in the shaft 14 are thus rotated until a stop projection 59 (FIGS. 1, 4 and 5) thereon abuts a side of a key 52 axially disposed on the body 10. A second key 54 (FIG. 1) of the body 10 preferably is disposed for alignment with the slot 46. It s hould be noted that the stop 52 has its left hand end disposed, as shown in FIgG. 1, to prevent axially motion of the wing by engagement therewith during its rotation.

It will be appreciated that, in lieu of the dual strain wave arrangement described, a dynamic spline arrangement (as taught in U.S. Letters Pat. No. 2,959,065 issued Nov. 8, 1960) employing a single set of flexspline teeth or a double set of flexspline teeth may be employed. The dynamic spline arrangement may be preferred for applications involving lower ratio drives, or for achieving different efficiency.

When the shaft 14 can no longer rotate in the same direction as it is initially driven by the motor 22 due to the stop 50 abutting the side of the key 52, continued output torque of the motor is shunted from the shaft 24 to the motor-grounded circular spline 32 which now counter rotates relative to the body 10 to drive the helical spline teeth 42. This is so because the hinge pin arrangement, including the transmission and the motor, is axially contained by the thrust bearings 19,21 on each end to react the thrust component generated by the rection torque through the helical spline 32. This torque may produce a force in either left or right direction, viewing FIGS. 1, 5, depending on the orientation of the wing relative to the direction of the pull of gravity, but when the stop 50 engages the side of the key 52, reaction torque on the helical spline will always cause shaft 14 to translate and lock with the keyway. Since the helical spline teeth 44 are relatively anchored against rotation, the circular spline 32 together with the motsr 22, the shaft 14 and the wing 12 are jointly moved in translation to cause the slots 46 and 48 respectively to receive the keys 52 and 54. Thus the wing 12 is locked in its new angular and lateral relation to the body 10 as shown in FIG. 6.

It will be apparent that various modifications may be made in the illustrative construction without departing from the scope of this invention. For instance, the stop 50 need not be on the shaft 14 but may be on the wing 12, or located elsewhere on the shaft 14, provided in all cases relative rotation of the shaft 14 ceases when the interengaging slots and keys are aligned. Also, of course, the keys may be angularly offset provided their corresponding slots are similarly offset. Additionally, it will be understood that in a shorter hinging construction only one slot and key formation is required, and more than two may be employed in longer arrangements to insure dynamic balance. The helix angle can be changed to produce different thrust values and corresponding rates of linear to rotational travel. Upon the keys seating on the keyways, the motor can be made to stall or be deenergized.

It will be appreciated that a reversal of motor drive is effective to unlock the body 10 and wing 12 laterally, the shaft 14 being free to rotate when the slots 46,48 are unkeyed so that the parts can revert to their initial relative positions. By reason of the irreversibility feature of the dual reduction unit, an overspeed condition will be prevented if the output torque would be an assisting load, and it could also act to hold the wing in stowed position to prevent it from backdriving the transmission. Although positive rotational stops are herein shown, it will be understood that a braking mechanism may instead be employed if desired.

Having thus described my invention, what I claim as new and desire to secure by Letters Patent of the United States is:

1. Actuating mechanism for controlling the relative positions of two members hinged by a rotatable and axially slidable shaft, the mechanism comprising a motor-reducer unit coaxial with the shaft and having a helical reactive member in its driving connection therewith, a slot and cooperating key formed one on the shaft and the other on one of the two members, and an engageable stop means on the shaft and one of the two members arranged to align said slot and key circumferentially whereby upon such alignment the output of the motor-reducer unit is effective through rotation of the helical reactive member to shift the shaft in translation and thereby rotationally lock it by engagement of the key in said slot.

2. Mechanism as set forth in claim 1 wherein an end of the key acts as an abutment to prevent axial motion of the shaft during rotation thereof.

3. Actuating mechanism as set forth in claim 1 wherein the motor-reducer unit includes harmonic drive gearing, and the shaft is secured for joint movement with one of said two members, the one member being axially contained between thrust bearings on the other.

4. An actuating mechanism as set forth in claim 1 wherein the motor-reducer unit comprises a drive shaft for operating a wave generator, a circular spline coupled to the motor housing and having a set of internal spline teeth and at least one external helical spline meshing with a corresponding helical formation on one of said two members, a dual flexspline cooperate with the wave generator and having one set of spline teeth meshing with said internal circular spline teeth, a dual circular spline having one set of internal spline teeth cooperating with a second set of spline teeth of said dual flexspline, and the second set of spline teeth of said dual circular spline meshing with spline teeth formed on said hinge shaft.

5. Actuator mechanism as in claim 4 wherein each of said two members is formed with plain bearing portions for receiving said hinge shaft, and the external helical spline teeth of said circular spline coupled to the motor housing mesh with corresponding helical teeth circumferentially formed internally on one of said two members on one of its bearing portions.

6. Actuator mechanism as in claim 1 wherein the stop means on the shaft is an axial projection aligned with an axially extending wall defining a key receiving slot in the shaft.

7. Actuator mechanism as in claim 1 wherein the shaft is axially splined to one of the two members.

* * * * *